United States Patent
Kajisawa et al.

(10) Patent No.: US 12,128,969 B2
(45) Date of Patent: Oct. 29, 2024

(54) ELECTRIC POWER SOURCE DEVICE

(71) Applicants: JTEKT CORPORATION, Kariya (JP); TOYOTA JIDOSHA KABUSHIKI KAISHA, Toyota (JP)

(72) Inventors: Yuuta Kajisawa, Okazaki (JP); Fumihiko Sato, Kashiwara (JP); Masaharu Yamashita, Toyota (JP); Atsushi Satou, Miyoshi (JP); Masataka Okuda, Toyota (JP); Toshiyuki Mikida, Anpachi-gun (JP); Hiroaki Hanzawa, Toyota (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 365 days.

(21) Appl. No.: 17/411,153

(22) Filed: Aug. 25, 2021

(65) Prior Publication Data

US 2022/0063712 A1    Mar. 3, 2022

(30) Foreign Application Priority Data

Aug. 28, 2020   (JP) .................. 2020-144403

(51) Int. Cl.
  *B62D 5/04*    (2006.01)
(52) U.S. Cl.
  CPC ......... *B62D 5/0463* (2013.01); *B62D 5/0481* (2013.01)
(58) Field of Classification Search
  CPC ..................... B62D 5/0463; B62D 5/0481
  See application file for complete search history.

(56) References Cited

U.S. PATENT DOCUMENTS

| 2014/0174844 | A1* | 6/2014 | Nakai | B62D 5/046 180/446 |
| 2015/0015169 | A1* | 1/2015 | Yanagi | B60K 28/14 318/400.09 |
| 2017/0297433 | A1* | 10/2017 | Shibachi | B60R 16/03 |
| 2019/0061727 | A1 | 2/2019 | Mizusaki et al. | |

FOREIGN PATENT DOCUMENTS

| JP | 2019-004682 A | 1/2019 | |
| WO | WO-2017203806 A1 * | 11/2017 | B60R 16/03 |

OTHER PUBLICATIONS

Dec. 26, 2023 Office Action issued in Japanese Patent Application No. 2020-144403.

* cited by examiner

*Primary Examiner* — Jacob D Knutson
(74) *Attorney, Agent, or Firm* — Oliff PLC

(57) ABSTRACT

An electric power source device includes an auxiliary electric power source for a main electric power source that supplies electric power to electric power supply targets, including an electric circuit of a control system for controlling a specific control target and an electric circuit of a power system that requires larger electric power than the electric circuit of the control system; and a selection circuit configured to supply the electric power from one electric power source having a higher voltage, out of the main electric power source and the auxiliary electric power source, to at least the electric circuit of the control system among the electric power supply targets.

2 Claims, 2 Drawing Sheets

ELECTRIC POWER SOURCE DEVICE

CROSS-REFERENCE TO RELATED APPLICATION

This application claims priority to Japanese Patent Application No. 2020-144403 filed on Aug. 28, 2020, incorporated herein by reference in its entirety.

BACKGROUND

1. Technical Field

The present disclosure relates to an electric power source device.

2. Description of Related Art

A controller is known which controls a motor that is a source of generating assist torque imparted to a steering mechanism of vehicles. For example, a controller in Japanese Unexamined Patent Application Publication No. 2019-4682 controls electric power supply to a motor having windings of two systems. The controller has two drive circuits and two microcomputers corresponding to the two-system windings, respectively. The microcomputers independently control electric power supply to the windings of the corresponding systems through control of the corresponding circuits.

The controller has two electric power source generation circuits corresponding to the microcomputers of the two systems, respectively. The electric power source generation circuits receive electric power from their respective electric power sources provided independently of each other. The electric power source generation circuits use the electric power supplied from the corresponding electric power sources to generate electric power suitable for operation of the microcomputers. The microcomputers operate by consuming the electric power generated by the corresponding electric power source generation circuits.

SUMMARY

From the viewpoint of ensuring a higher reliability for the operation of a controller, it is considered to back up electric power supply to a microcomputer with an auxiliary electric power source when an electric power source is lost. For example, when the electric power source is lost, an electric power supply path between the electric power source and the microcomputer is disconnected, while an electric power supply path between the auxiliary electric power source and the microcomputer is connected. This allows the microcomputer to continue its operation using the electric power supplied from the auxiliary electric power source, even when its electric power source is lost.

However, when the electric power source and the auxiliary electric power source are switched through opening and closing of a switch provided in the electric power supply path, there is concern over interruption of electric power supply to the microcomputer, though the interruption is momentary. When the source voltage of the microcomputer drops below a lower limit of an operation guarantee range due to the interruption of electric power supply to the microcomputer, the microcomputer stops its operation and is reset. The reset is the process of initializing the internal state of the microcomputer.

When the source voltage of the microcomputer again reaches values within the operation guarantee range through electric power supply from the auxiliary electric power source, the microcomputer starts up and executes an initial check. The initial check refers to the process of inspecting for faults in the parts relating to driving the motor, for example, a winding and a drive circuit of the motor. After the execution of the initial check is completed, the microcomputer starts to execute control of the motor. In this way, a momentary interruption in the source voltage of the microcomputer may interfere with proper control of the motor.

The present disclosure can achieve more stable supply of electric power to electric power supply targets.

An aspect of the present disclosure relates to an electric power source device. The electric power source device include an auxiliary electric power source and a selection circuit. The auxiliary electric power source is for a main electric power source that supplies electric power to electric power supply targets, including an electric circuit of a control system for controlling a specific control target, and an electric circuit of a power system that requires larger electric power than the electric circuit of the control system. The selection circuit is configured to supply the electric power from one electric power source having a higher voltage, out of the main electric power source and the auxiliary electric power source, to at least the electric circuit of the control system among the electric power supply targets.

With the above configuration, when the voltage of the main electric power source drops below the voltage of the auxiliary electric power source, the electric power of the auxiliary electric power source is supplied to at least the electric circuit of the control system among the electric power supply targets. Even when electric power supply from the main electric power source to the electric power supply targets is interrupted due to loss of the main electric power source, electric power supply to at least the electric circuit of the control system, among the electric power supply targets, is not interrupted. This makes it possible to achieve more stable supply of electric power to the electric circuit of the control system among the electric power supply targets.

In the electric power source device, the selection circuit may include a first diode and a second diode. The first diode may be provided in a first electric power supply path for supplying the electric power of the main electric power source to at least the electric circuit of the control system among the electric power supply targets. The second diode may be provided in a second electric power supply path for supplying the electric power of the auxiliary electric power source to at least the electric circuit of the control system among the electric power supply targets, the second electric power supply path being connected to a downstream side of the first diode in the first electric power supply path.

With the above configuration, a so-called OR circuit formed of diodes allows the electric power from the electric power source having a higher voltage to be supplied to at least the electric circuit of the control system among the electric power supply targets. When the voltage of the main electric power source drops below the voltage of the auxiliary electric power source, the electric power of the auxiliary electric power source is supplied to at least the electric circuit of the control system among the electric power supply targets.

The electric power source device may further include a switching circuit configured to switch an electric power source for the electric circuit of the power system between the main electric power source and the auxiliary electric power source. The switching circuit may include a first switch configured to open and close a third electric power supply path for supplying the electric power of the main electric power source to the electric circuit of the power system, a second switch configured to open and close a fourth electric power supply path for supplying the electric power of the auxiliary electric power source to the electric circuit of the power system, and a control circuit configured to turn off the first switch and turn on the second switch when the voltage of the main electric power source drops.

With the above configuration, when the voltage of the main electric power source drops, the first switch is turned off to open the third electric power supply path, and the second switch is turned on to close the fourth electric power supply path. As a result, the electric power source for the electric circuit of the power system is switched from the main electric power source to the auxiliary electric power source. Even when electric power supply from the main electric power source to the electric circuit of the power system is interrupted due to loss of the main electric power source, electric power supply to the electric circuit of the power system is not interrupted.

It is also possible to adopt an electric power source device configured to use an OR circuit formed of diodes to supply electric power from one electric power source having a higher voltage, out of the main electric power source and the auxiliary electric power source, to the electric circuit of the power system among the electric power supply targets. However, the diodes cause loss of electric power. Accordingly, from the view point of reducing consumption of the auxiliary electric power source, it is desirable to provide electric power to the electric circuit of the power system that requires larger electric power through an electric power supply path provided with a switch that is less in power loss as in the electric power source device described in the foregoing.

In the electric power source device, the electric power supply target may be a controller of an in-vehicle device. The controller of the in-vehicle device requires higher operational reliability. The electric power source device is suitable as the controller of the in-vehicle device.

The present disclosure can achieve more stable supply of electric power to electric power supply targets.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
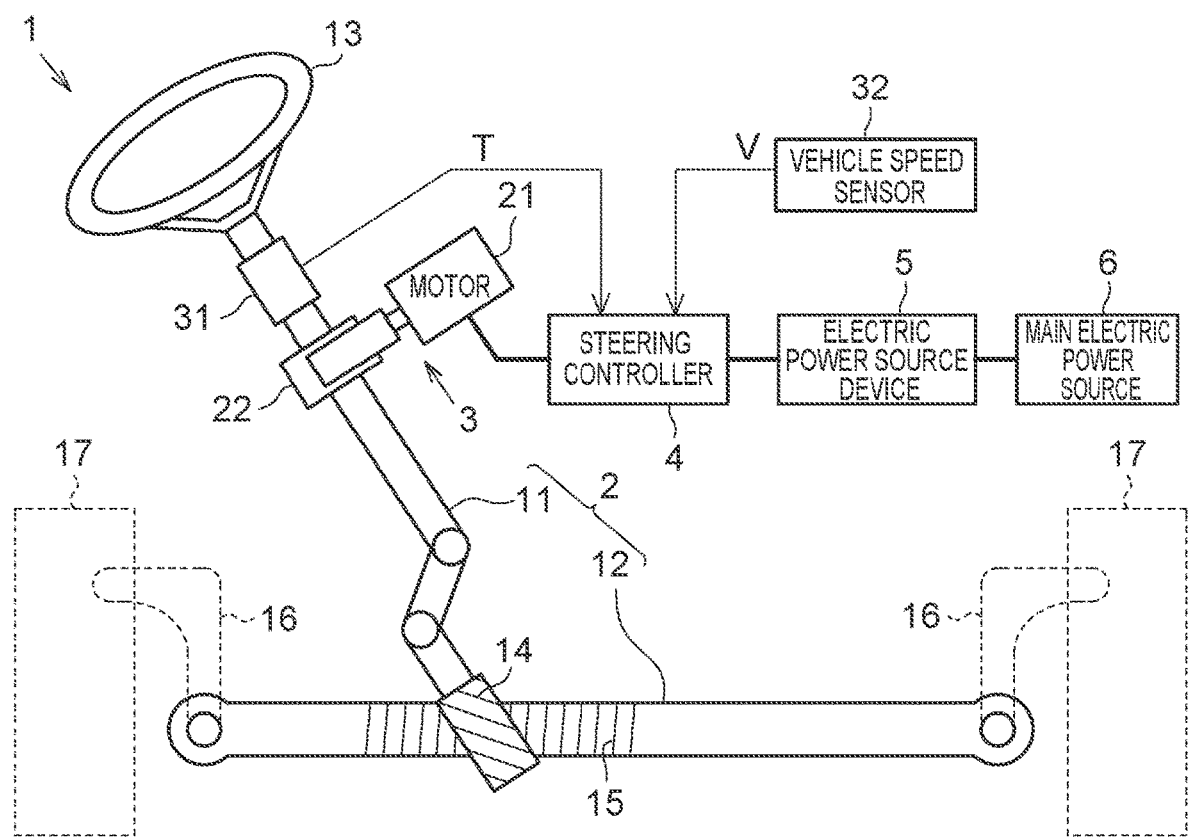
FIG. 1 is a configuration view of a steering device applied with an embodiment of the electric power source device.

Hereinafter, an embodiment of an electric power source device applied to a steering device will be described. As shown in FIG. 1, a steering device 1 includes a steering mechanism 2, an assist mechanism 3, a steering controller 4, and an electric power source device 5.

The steering mechanism 2 has a steering shaft 11 and a turning shaft 12. The steering shaft 11 has a first end part fixed to a steering wheel 13. The steering shaft 11 has a second end part, which is an end part opposite to the steering wheel 13, equipped with a pinion gear 14. The pinion gear 14 engages with a rack gear 15 provided on the turning shaft 12. The rotational motion of the steering shaft 11 is converted into a reciprocating linear motion in an axial direction of the turning shaft 12 through the engagement between the pinion gear 14 and the rack gear 15. The reciprocating linear motion of the turning shaft 12 is transmitted to right and left turning wheels 17 via tie rods 16 coupled with both the ends of the turning shaft 12, so that a turning angle of the turning wheels 17 is changed.

The assist mechanism 3 includes a motor 21 and a decelerator 22. As the motor 21, a three-phase brushless motor is adopted. As the decelerator 22, a worm gear mechanism is adopted. The motor 21 is coupled to the steering shaft 11 via the decelerator 22. The decelerator 22 decelerates the rotation of the motor 21, and transmits the decelerated rotational force to the steering shaft 11. This means that the torque of motor 21 is transmitted as steering assist force to the steering shaft 11 via the decelerator 22 so as to assist the steering operation of a driver.

The steering controller 4 is connected to an in-vehicle main electric power source 6 via the electric power source device 5. As the main electric power source 6, a battery is adopted, for example. The steering controller 4 operates by consuming the electric power of the main electric power source 6 that is supplied via the electric power source device 5. The steering controller 4 controls electric power supply to the motor 21 in accordance with detection results of various kinds of sensors provided in the vehicle. Examples of the sensors may include a torque sensor 31, and a vehicle speed sensor 32. The torque sensor 31 is provided on the steering shaft 11 to detect a steering torque T. The vehicle speed sensor 32 detects a vehicle speed V. The steering controller 4 calculates a target assist force based on the steering torque T and the vehicle speed V, and supplies the motor 21 with electric power used for the assist mechanism 3 to generate the target assist force.

Figure 2:
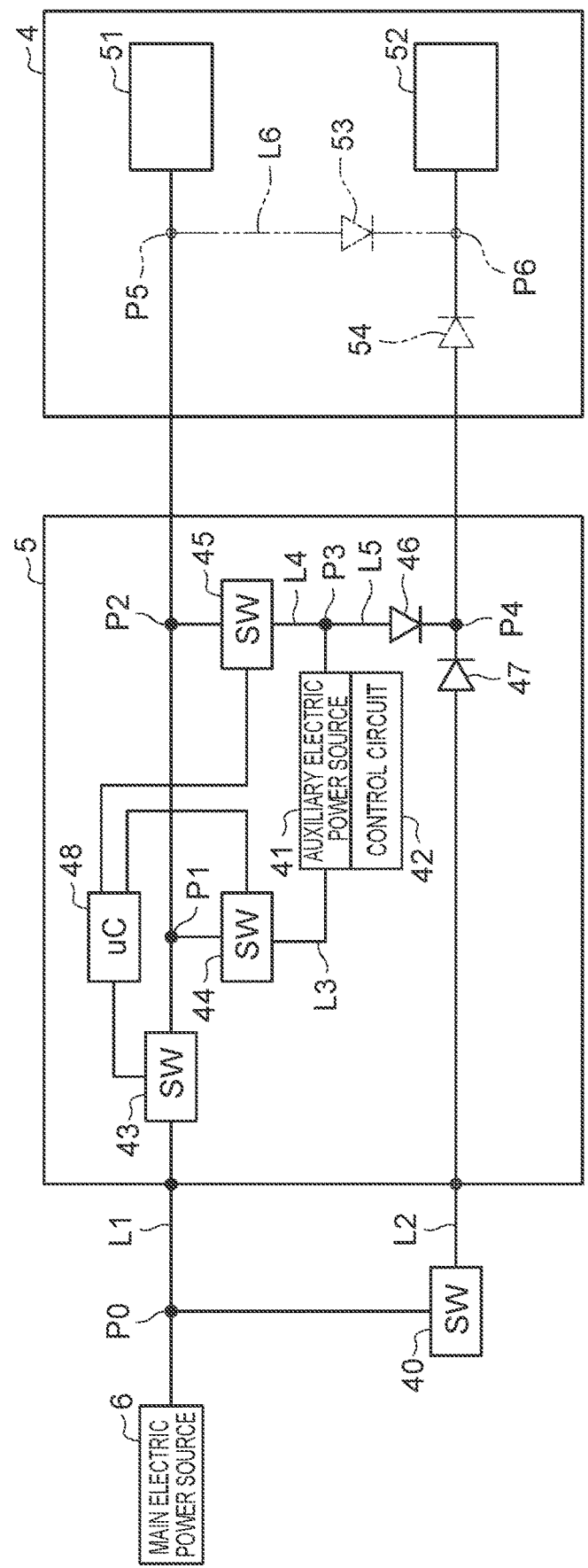
FIG. 2 is a block diagram of the embodiment of the electric power source device.

Next, the electric power source device 5 will be described in detail. As shown in FIG. 2, the electric power source device 5 is provided over two electric power source lines L1, L2 that connect between the main electric power source 6 and the steering controller 4. The electric power source line L2 branches from a connection point P0 that is set between the main electric power source 6 and the electric power source device 5 on the electric power source line L1. The electric power source line L2 is equipped with an electric power source switch 40 for a vehicle, such as an ignition switch. The electric power source switch 40 is operated at the time of operating a traveling drive source of the vehicle, such as an engine. Through operation of the electric power source switch 40, conduction of the electric power source line L2 is turned on and off.

The electric power of the main electric power source 6 is supplied to the electric circuit 51 of the power system in the steering controller 4 via the electric power source line L1. The electric circuit 51 of the power system is a circuit that handles larger electric power. The electric circuit 51 includes, for example, an inverter that converts direct-current electric power of the main electric power source 6 into alternating-current electric power. The electric power of the main electric power source 6 is supplied to the electric circuit 52 of the control system in the steering controller 4 via the electric power source line L2. The electric circuit 52 of the control system is a circuit for controlling the motor 21. The electric circuit 52 includes, for example, a microcomputer.

The electric power source device 5 includes an auxiliary electric power source 41, a charge-discharge control circuit 42, switches 43, 44, 45, diodes 46, 47, and a microcomputer (μC) 48. As the auxiliary electric power source 41, an electric storage device capable of charging and discharging charges, such as a lithium-ion capacitor, is adopted. The auxiliary electric power source 41 has a voltage V2 that is set to a value higher than the lower limit of a voltage V0 required for proper operation of the steering controller 4 and lower than a voltage V1 of the main electric power source 6 as expressed by a following expression (A):

$$V1>V2>V0 \quad (A)$$

In the electric power source device 5, the auxiliary electric power source 41 is connected to a connection point P1 on the electric power source line L1 via a branch line L3. In the electric power source device 5, the auxiliary electric power source 41 is also connected to a connection point P2 on the electric power source line L1 via a branch line L4. Note that the connection point P2 is located closer to the steering controller 4 than the connection point P1.

The charge-discharge control circuit 42 controls charging and discharging of the auxiliary electric power source 41. The switch 43 is provided on the electric power source line L1 in the electric power source device 5. The switch 43 is located closer to the main electric power source 6 than the connection point P1.

The switch 44 is provided on the branch line L3 in the electric power source device 5. The switch 44 opens and closes the branch line L3. The switch 45 is provided on the branch line L4 in the electric power source device 5. The switch 45 opens and closes the branch line L4.

The branch line L4 has a connection point P3 set therein. In the electric power source device 5, a branch line L5 is provided to connect between the connection point P3 on the branch line L4 and the connection point P4 on the electric power source line L2. The diode 46 is provided on the branch line L5. The diode 46 has a cathode connected to the connection point P4 of the electric power source line L2. The diode 46 has an anode connected to the connection point P3 of the branch line L5.

The diode 47 is provided on the electric power source line L2. The diode 47 has a cathode connected to the connection point P4 on the electric power source line L2. The diode 47 has an anode connected to the electric power source switch 40.

The diodes 46, 47 allow the flow of electric power from the anode to the cathode, while restricting the flow of electric power from the cathode to the anode. The diodes 46, 47 constitutes an OR circuit (i.e., wired OR) that supplies electric power from one electric power source having a higher voltage, out of the main electric power source 6 and the auxiliary electric power source 41, to the electric circuit 52 of the control system.

The microcomputer 48 controls opening and closing of the switches 43, 44, 45. The microcomputer 48 monitors the voltage of the main electric power source 6. The microcomputer 48 determines that a voltage Vb of the main electric power source 6 has dropped when the voltage Vb of the main electric power source 6 is less than a threshold voltage Vth, as expressed by a following expression (B). The threshold voltage Vth is a basis of determining the voltage drop of the main electric power source 6. The threshold voltage Vth is set based on the lower limit of a voltage V0 that is required for proper operation of the motor 21 or the steering controller 4. In the present embodiment, the threshold voltage Vth is set to the same value as the voltage V0.

$$V1<Vth \quad (B)$$

When no voltage drop of the main electric power source 6 is detected, the microcomputer 48 keeps the switches 43, 44 in an ON state, and the switch 45 in an OFF state. The microcomputer 48 also switches the switches 43, 44 from the ON state to the OFF state, when voltage drop of the main electric power source 6 is detected. The microcomputer 48 then switches the switch 45 from the OFF state to the ON state.

The steering controller 4, including the electric circuits 51, 52, corresponds to the power supply targets. The motor 21 corresponds to the specific control target. The switch 43 corresponds to the first switch that constitutes a switching circuit. The switch 45 corresponds to the second switch that constitutes the switching circuit. The microcomputer 48 corresponds to the control circuit that controls opening and closing of the first switch and the second switch. The diode 47 corresponds to the first diode that constitutes a selection circuit. The diode 46 corresponds to the second diode that constitutes the selection circuit.

The electric power source line L2 constitutes the first electric power supply path for supplying the electric power of the main electric power source to the electric power supply targets (the electric circuit of the control system). The branch line L5 constitutes the second electric power supply path for supplying the electric power of the auxiliary electric power source to the electric power supply targets (the electric circuit of the control system). The electric power source line L1 constitutes the third electric power supply path for supplying the electric power of the main electric power source to the electric circuit of the power system. The branch line L4 constitutes the fourth electric power supply path for supplying the electric power of the auxiliary electric power source to the electric circuit of the power system.

Next, the functions of the electric power source device 5 will be described. When no drop in voltage V1 of the main electric power source 6 is detected, the switches 43, 44 are kept in the ON state, while the switch 45 is kept in the OFF state. Accordingly, the electric power from the main electric power source 6 is supplied to the electric circuit 51 of the power system in the steering controller 4 via the electric power source line L1. The electric power from the main electric power source 6 is charged in the auxiliary electric power source 41 via the branch line L3. Even when the electric power source switch 40 is in the OFF state, the electric power of the auxiliary electric power source 41 is supplied to the electric circuit 52 of the control system in the steering controller 4 via part of the branch line L5 and part of the electric power source line L2.

When the voltage V1 of the main electric power source 6 does not drop, the electric power from the main electric power source 6 is supplied to the electric circuit 52 of the control system in the steering controller 4 via the electric power source line L2 when the electric power source switch 40 is turned ON. Since the voltage V1 of the main electric power source 6 is set to be higher than the voltage of the auxiliary electric power source 41, the electric power of the auxiliary electric power source 41 is not supplied to the steering controller 4 via the branch line L5. The diode 46 also restricts the electric power, coming from the main electric power source 6 through the electric power source line L2, from flowing into the auxiliary electric power source 41 via the branch line L5.

When the main electric power source 6 is lost and the voltage V1 of the main electric power source 6 drops below the voltage V2 of the auxiliary electric power source 41, the electric power of the auxiliary electric power source 41 is immediately supplied to the electric circuit 52 of the control system in the steering controller 4 via part of the branch line L5 and part of the electric power source line L2. This is because the voltage V2 of the auxiliary electric power source 41 becomes higher than the voltage generated on the electric power source line L2. Even when electric power supply from the main electric power source 6 to the steering controller 4 is interrupted due to loss of the main electric power source 6, electric power supply to the electric circuit 52 of the control system is backed up by the auxiliary electric power source 41.

When the voltage V1 of the main electric power source 6 drops further and the voltage V1 of the main electric power source 6 drops below the threshold voltage Vth, the switches 43, 44 are switched from the ON state to the OFF state. Then, the switch 45 is switched from the OFF state to the ON state. Consequently, the electric power from the auxiliary electric power source 41 is supplied to the electric circuit 51 of the power system in the steering controller 4 via part of the branch line L4 and part of the electric power source line L1. This is because the voltage V2 of the auxiliary electric power source 41 becomes higher than the voltage generated on the electric power source line L1 due to the loss of the main electric power source 6. Therefore, even when electric power supply from the main electric power source 6 to the steering controller 4 is interrupted due to loss of the main electric power source 6, electric power supply to the electric circuit 51 of the power system in the steering controller 4 is backed up by the auxiliary electric power source 41.

Incidentally, it is considered to provide the branch line L4 with a diode in place of the switch 45. In this way, when the main electric power source 6 is lost, the electric power of the auxiliary electric power source 41 is immediately supplied to the electric circuit 51 of the power system. However, the diode causes loss of electric power. Therefore, form the viewpoint of reducing consumption of the auxiliary electric power source 41, the branch line L4 for supplying electric power to the electric circuit 51 of the power system, which requires larger electric power, is provided with the switch 45 instead of the diode.

It is also considered to provide the branch line L5 with a switch in place of the diode 46. However, in such a case, there is a following concern. That is, it takes a small amount of time before the switch of the branch line L5 is switched from OFF to ON after the main electric power source 6 is lost and electric power supply from the main electric power source 6 is interrupted. Hence, during a period of time when the switch of the branch line L5 is switched from OFF to ON, the microcomputer of the electric circuit 52 of the control system may possibly be reset due to momentary interruption of electric power supply to the electric circuit 52. In this regard, when the branch line L5 is provided with the diode 46, the electric power from the auxiliary electric power source 41 is immediately supplied to the electric circuit 52 of the control system via part of the branch line L5 and part of the electric power source line L2 in the case where the main electric power source 6 is lost. Since electric power supply to the electric circuit 52 of the control system is not interrupted, the microcomputer of the electric circuit 52 is not reset due to the drop in supply voltage.

Therefore, the present embodiment can provide the following effects. When the voltage V1 of the main electric power source 6 drops below the voltage V2 of the auxiliary electric power source 41, the electric power of the auxiliary electric power source 41 is immediately supplied to the electric circuit 52 of the control system in the steering controller 4 via part of the branch line L5 and part of the electric power source line L2. Even when electric power supply to the steering controller 4 from the main electric power source 6 is interrupted due to loss of the main electric power source 6, electric power supply to the electric circuit 52 of the control system is not interrupted. Hence, the microcomputer of the electric circuit 52 is not reset. When the voltage V1 of the main electric power source 6 drops below the threshold voltage Vth, the electric power of the auxiliary electric power source 41 is supplied to the electric circuit 51 of the power system in the steering controller 4 via part of the branch line L4 and part of the electric power source line L1. Even when electric power supply from the main electric power source 6 to the steering controller 4 is interrupted due to loss of the main electric power source 6, electric power supply to the electric circuit 51 of the power system is not interrupted. This allows the motor 21 to continue to operate. In this way, the electric power source device 5 can achieve more stable supply of electric power to the steering controller 4.

In the electric power source device 5, the main electric power source 6 and the auxiliary electric power source 41 are connected to the electric circuit 52 of the control system in the steering controller 4 via the OR circuit formed of diodes. In other words, electric power is supplied from one electric power source having a higher voltage, out of the main electric power source 6 and the auxiliary electric power source 41, to the electric circuit 52 of the control system. As a result, when the voltage of the main electric power source 6 drops, the electric power source to the electric circuit 52 of the control system is immediately switched from the main electric power source 6 to the auxiliary electric power source 41 in the manner of hardware. Therefore, even when the main electric power source 6 is lost, electric power supply to the electric circuit 52 of the control system is not interrupted. It is also possible to simplify the configuration of the electric power source device 5.

The auxiliary electric power source 41 is connected to the electric circuit 51 of the power system in the steering controller 4 via the switch 45. Although it can be considered to connect the auxiliary electric power source 41 to the electric circuit 51 of the power system via a diode, the diode causes more electric power loss. Accordingly, it is desirable to supply electric power to the electric circuit 51 of the power system that requires larger electric power via the branch line L4 provided with the switch 45 having less electric power loss. Therefore, when the main electric power source 6 is lost, it is possible to continue to supply electric power to the electric circuit 51 of the power system, while reducing the consumption of the auxiliary electric power source 41.

The steering controller 4 requires higher operational reliability. For this reason, the electric power source device 5 of the present embodiment is suitable as an electric power source device of the steering controller 4.

Other Embodiments

The present embodiment may be carried out with modifications as shown below.

As shown with a two-dot chain line in FIG. 2, in the steering controller 4, the electric power source line L1 and the electric power source line L2 may be connected to the electric circuit 52 of the control system via an OR circuit formed of diodes. Specifically, in the steering controller 4, an electric power source line L6 is provided to connect between a connection point P5 on the electric power source line L1 and a connection point P6 on the electric power source line L2. The electric power source line L6 is provided with a diode 53. The diode 53 has an anode connected to the connection point P5 on the electric power source line L1, and has a cathode connected to the connection point P6 on the electric power source line L2. In the steering controller 4, the electric power source line L2 is provided with a diode 54. The diode 54 has an anode connected to the side of the electric power source device 5, and has a cathode connected to the connection point P6 on the electric power source line L2.

With such configuration, electric power from one of the main electric power source 6 and the auxiliary electric power source 41 is supplied to the electric circuit 52 of the control system. When the voltage of the main electric power source 6 does not drop, the electric power from the main electric power source 6 is supplied to the electric circuit 52 of the control system via the diode 53 on the electric power source line L6. This is because the voltage applied to the diode 53 on the electric power source line L6 is higher by an amount corresponding to the voltage drop of the diode 47 than the voltage applied to the diode 54 on the electric power source line L2. When the voltage of the main electric power source 6 does not drop, it is possible to supply a larger voltage to the electric circuit 52 of the control system to achieve more reliable operation of the electric circuit 52 of the control system. When the main electric power source 6 is lost and the voltage of the main electric power source 6 drops, the electric power from the auxiliary electric power source 41 is supplied to the electric circuit 52 of the control system via the diode 54 on the electric power source line L2. Electric power is supplied to the electric circuit 52 of the control system without interruption.

As the auxiliary electric power source 41, a battery may be adopted instead of the lithium-ion capacitor. For example, the voltage V2 of the auxiliary electric power source 41 may be set to a value similar to that of the main electric power source 6.

When the power loss is a negligible level, the branch line L4 may be provided with a diode in place of the switch 45. In this case, a diode is also provided between the connection point P2 on the electric power source line L1 and the switch 43. With the configuration, an OR circuit constituted of diodes is formed. Accordingly, when the voltage V1 of the main electric power source 6 drops below the voltage V2 of the auxiliary electric power source 41, the electric power of the auxiliary electric power source 41 is immediately supplied to the electric circuit 51 of the power system via part of the branch line L4 and part of the electric power source line L1.

The steering device 1 applied with the electric power source device 5 may be a type of electric power steering device that imparts the torque of the motor 21 to the turning shaft 12. The steering device 1 applied with the electric power source device 5 may also be a steer-by-wire steering device.

The electric power supply targets of the electric power source device 5 are not limited to the steering controller 4. The electric power supply targets of the electric power source device 5 may be the controller of an airbag system or the controller of a brake system. Moreover, the electric power supply targets of the electric power source device 5 may be the controller of a driving motor in unmanned vehicles or electric vehicles.

What is claimed is:

1. An electric power source device comprising:
an auxiliary electric power source to a main electric power source that supplies electric power to electric power supply targets, including an electric circuit of a control system configured to control a specific control target, and an electric circuit of a power system that requires larger electric power than the electric circuit of the control system; and
a selection circuit configured to supply the electric power of one electric power source having a higher voltage, out of the main electric power source and the auxiliary electric power source, to at least the electric circuit of the control system among the electric power supply targets, wherein:
the selection circuit includes a first diode and a second diode;
the first diode is provided in a first electric power supply path configured to supply the electric power of the main electric power source to at least the electric circuit of the control system among the electric power supply targets;
the second diode is provided in a second electric power supply path configured to supply the electric power of the auxiliary electric power source to at least the electric circuit of the control system among the electric power supply targets, the second electric power supply path being connected to a downstream side of the first diode in the first electric power supply path, and
a switching circuit configured to switch an electric power source for the electric circuit of the power system between the main electric power source and the auxiliary electric power source, wherein
the switching circuit includes:
a first switch configured to open and close a third electric power supply path configured to supply the electric power of the main electric power source to the electric circuit of the power system;
a second switch configured to open and close a fourth electric power supply path configured to supply the electric power of the auxiliary electric power source to the electric circuit of the power system;
a third switch configured to open and close a fifth electric power supply path configured to supply the electric power of the auxiliary electric power source to the main electric power source;
a control circuit configured to turn off the first switch and turn on the second switch when the control circuit detects that the voltage of the main electric power source drops;
the fifth electric power supply path is connected to a first connection point on the third electric power supply path, the first connection point is on the downstream side of the first switch;
the fourth electric power supply path is connected to a second connection point on the third electric power supply path, the second connection point is on the downstream side of the first connection point.

2. The electric power source device according to claim 1, wherein one of the electric power supply target is a controller of an in-vehicle device.

* * * * *